US005792403A

United States Patent [19]

Massa et al.

[11] Patent Number: 5,792,403

[45] Date of Patent: Aug. 11, 1998

[54] METHOD OF MOLDING GREEN BODIES

[75] Inventors: Ted R. Massa, Latrobe; John S. Van Kirk, Murrysville; Robert R. McNaughton, Jr., New Alexandria, all of Pa.

[73] Assignee: Kennametal Inc., Latrobe, Pa.

[21] Appl. No.: 594,609

[22] Filed: Feb. 2, 1996

Related U.S. Application Data

[62] Division of Ser. No. 363,467, Dec. 23, 1994, Pat. No. 5,762,843.

[51] Int. Cl.$^6$ .................. B29C 59/00

[52] U.S. Cl. .................. 264/122; 264/570; 264/313; 419/68

[58] Field of Search .................. 264/570, 122, 264/313; 419/68

[56] References Cited

U.S. PATENT DOCUMENTS

| | | | |
|---|---|---|---|
| 2,888,247 | 5/1959 | Haglund | 255/63 |
| 3,576,050 | 4/1971 | Thomas | 425/405.2 |
| 3,650,646 | 3/1972 | Kirkpatrick et al. | 425/405.2 |
| 3,850,368 | 11/1974 | Boeckeler | 233/25 |
| 3,888,662 | 6/1975 | Boeckeler | 75/203 |
| 3,909,895 | 10/1975 | Abrahamson et al. | 29/95 |
| 3,922,127 | 11/1975 | Schwarzkopf | 425/405.2 |

(List continued on next page.)

FOREIGN PATENT DOCUMENTS

| | | |
|---|---|---|
| 1119850 | 3/1982 | Canada . |
| 0072175 | 2/1983 | European Pat. Off. . |
| 0111600 | 6/1984 | European Pat. Off. . |
| 0233162 | 8/1987 | European Pat. Off. . |
| 0498781 | 8/1992 | European Pat. Off. . |
| 0542704 | 5/1993 | European Pat. Off. . |
| 2343885 | 1/1977 | France . |
| 3005684 | 8/1981 | Germany . |

(List continued on next page.)

OTHER PUBLICATIONS

Principles of Ceramic Processing, Second Edition, by James S. reed, Wiley–Interscience, 1995.

Viswanadham, R. K., "Stability of Microstructural Discontinuities in Cemented Carbides," International Journal of Powder Metallurgy, Oct. 1987, USA, vol. 23, No. 4, ISSN 0361-3488, pp. 229–235.

"Cemented Carbide in High Pressure Equipment", B. Zetterlund, *High Pressure Engineering*, vol. 2 (1977), pp. 35–40.

(List continued on next page.)

*Primary Examiner*—Christopher A. Fiorilla
*Attorney, Agent, or Firm*—Stanislav Antolin

[57] ABSTRACT

Methods for making, methods for using and articles including cermets, preferably cemented carbides and more preferably tungsten carbide, having at least two regions exhibiting at least one property that differs are discussed. Preferably, the cermets further exhibit a portion that is binder rich and which gradually or smoothly transitions to at least a second region. The multiple-region cermets are particularly useful in compressively loaded application wherein a tensile stress or fatigue limit might otherwise be excessive for monolithic articles. The cermets are manufactured by juxtaposing and densifying at least two powder blends having different properties (e.g., differential carbide grain size, differential carbide chemistry, differential binder content, differential binder chemistry, or any combination of the preceding). Preferably, a first region of the cermet includes a first ceramic component and a prescribed binder content and a second region, juxtaposing or adjoining the first region, of the cermet includes a second ceramic component and a second binder content less than the prescribed binder content. The multiple region cermets of the present invention may be used in materials processing technology including, for example, compression technology, extrusion, supercritical processing, chemical processing, materials processing, and ultrahigh pressure.

53 Claims, 6 Drawing Sheets

U.S. PATENT DOCUMENTS

| | | | |
|---|---|---|---|
| 3,975,131 | 8/1976 | Bergounhon | 425/405.2 |
| 4,046,499 | 9/1977 | Saito | 425/405.2 |
| 4,056,347 | 11/1977 | Trolle | 425/405.2 |
| 4,194,790 | 3/1980 | Kenny et al. | 299/79 |
| 4,249,955 | 2/1981 | Grab et al. | 106/308 |
| 4,330,251 | 5/1982 | Lebas et al. | 425/405.2 |
| 4,359,335 | 11/1982 | Garner | 75/208 |
| 4,409,174 | 10/1983 | Toy et al. | 425/405.2 |
| 4,472,350 | 9/1984 | Urano | 425/405.2 |
| 4,491,559 | 1/1985 | Grab et al. | 419/36 |
| 4,582,682 | 4/1986 | Betz et al. | 425/405.2 |
| 4,610,931 | 9/1986 | Nemeth et al. | 428/547 |
| 4,705,124 | 11/1987 | Abrahamson et al. | 175/410 |
| 4,722,405 | 2/1988 | Langford, Jr. | 175/374 |
| 4,743,515 | 5/1988 | Fischer et al. | 428/698 |
| 4,820,482 | 4/1989 | Fischer et al. | 419/15 |
| 4,854,405 | 8/1989 | Stroud | 175/374 |
| 4,956,012 | 9/1990 | Jacobs et al. | 75/236 |
| 4,999,157 | 3/1991 | Nishio et al. | 425/405.2 |
| 5,019,307 | 5/1991 | Brewer et al. | 264/67 |
| 5,074,623 | 12/1991 | Hedlund et al. | 299/79 |
| 5,250,367 | 10/1993 | Santhanam et al. | 428/698 |
| 5,333,520 | 8/1994 | Fischer et al. | 76/108.2 |
| 5,335,738 | 8/1994 | Waldenstrom et al. | 175/420.2 |
| 5,453,241 | 9/1995 | Akerman et al. | 419/14 |
| 5,467,669 | 11/1995 | Stroud | 76/108 |
| 5,543,235 | 8/1996 | Mirchandani et al. | 428/547 |
| 5,593,474 | 1/1997 | Keshavan et al. | 75/240 |

FOREIGN PATENT DOCUMENTS

| | | |
|---|---|---|
| 3519101 | 5/1985 | Germany . |
| 659765 | 10/1951 | United Kingdom . |
| 806406 | 12/1958 | United Kingdom . |
| 911461 | 11/1962 | United Kingdom . |
| 1115908 | 10/1965 | United Kingdom . |
| 1115908 | 6/1968 | United Kingdom . |
| 1383429 | 2/1974 | United Kingdom . |
| 2004315 | 3/1979 | United Kingdom . |
| 2017153 | 10/1979 | United Kingdom . |
| 2037223 | 7/1980 | United Kingdom . |

OTHER PUBLICATIONS

"Utilization of Magnetic Saturation Measurements for Carbon Control in Cemented Carbides", D. R. Moyle & E. R. Kimmel, *1984 ASM/SCTE Conference on Technology Advancements in Cemented Carbide Production,* Pittsburgh, PA 2–4 Dec. 1984, also available as *Metals/Materials Technology Series No. 8415–009* (1984), pp. 1–5, American Society for Metals, Metals Park, Ohio.

"Binder Mean–Free–Path Determination in Cemented Carbide by Coercive Force and Material Composition", R. Porat & U. Malek, *Materials Science and Engineering,* vol. A105/106 (1988), pp. 289–292.

"Standard Practice for Evaluating Apparent Grain Size and Distribution of Cemented Tungsten Carbides", ASTM Designation B–390–92, *1992 Annual Book of ASTM Standards,* vol. 02.05, pp. 156–159.

"Isotropic and Gradient Hard Metals Fabricated by Infiltration", M. Gasik, V. Jaervelae, K. Lilius & S. Stroemberg, *Proceeding of the 13th International Plansee Seminar,* Eds. H. Bildstein & M. Ede, *Metallwerk Plansee,* vol. 2 (1993), pp. 553–561.

"Processing of Functional–Gradient WC–Co Cermets by Powder Metallurgy", C. Colin, L. Durant, N. Favrot, J. Besson, G. Barbier, & F. Delannay, *International Journal of Refractory Metals & Hard Materials,* vol. 12, No. 3 (1993–1994), pp. 145–152.

METHOD OF MOLDING GREEN BODIES

This is a divisional of application Ser. No. 08/363,467 filed on Dec. 23, 1994 now U.S. Pat. No. 5,762,843.

BACKGROUND

Cermet is a term used to describe a monolithic material composed of a ceramic component and a binder component. The ceramic component comprises a nonmetallic compound or a metalloid. The ceramic component may or may not be interconnected in two or three dimensions. The binder component comprises a metal or alloy and is generally interconnected in three dimensions. The binder component cements the ceramic component together to form the monolithic material. Each monolithic cermet's properties are derived from the interplay of the characteristics of the ceramic component and the characteristics of the binder component.

A cermet family may be defined as a monolithic cermet consisting of specified ceramic component combined with a specified binder component. Tungsten carbide cemented together by a cobalt alloy is an example of a family (WC—Co family, a cemented carbide). The properties of a cermet family may be tailored, for example, by adjusting an amount, a characteristic feature, or an amount and a characteristic feature of each component separately or together. However, an improvement of one material property invariably decreases another. When, for example, in the WC—Co family resistance to wear is improved, the resistance to breakage generally decreases. Thus, in the design of monolithic cemented carbides there is a never ending cycle that includes the improvement of one material property at the expense of another.

Despite this, monolithic cemented carbides are used in equipment subject to large compressive stresses. However, rather than build the entire equipment from monolithic cemented carbides, only selected portions of the equipment comprise the monolithic cemented carbide. These portions, in addition to large compressive stresses, may experience aggressive wear, impact, tensile stresses, fatigue, or any combination of the preceding. In some equipment the cemented carbide portion has a specified profile that creates tensile stresses within the specified surfaces of the monolithic cemented carbide although the overall body experiences large compressive stresses. Because the tensile stresses may exceed the tensile strength of the cemented carbide or the fatigue limit of the cemented carbide is exceeded, it catastrophically fails.

A solution to the endless cycle of adjusting one property of a monolithic cermet at the expense of another is to combine several monolithic cermets to form a multiple-region cermet article. The resources (i.e., both time and money) of many individuals and companies throughout the world have been directed to the development of multiple-region cemented carbide articles. The amount of resources directed to the development effort is demonstrated by the number of publications, US and foreign patents, and foreign patent publications on the subject. Some of the many US and foreign patents, and foreign patent publications include: U.S. Pat. Nos. 2,888,247; 3,909,895; 4,194,790; 4,359,355; 4,427,098; 4,722,405; 4,743,515; 4,820,482; 4,854,405; 5,074,623; and 5,335,738, and foreign patent publication nos. DE-A-3 519 101; GB-A 806 406; EPA-O 111 600; DE-A-3 005 684; FR-A-2 343 885; GB-A-1 115 908; GB-A-2 017 153; and EP-A-0 542 704. Despite the amount of resources dedicated, no satisfactory multiple-region cemented carbide article is commercially available nor for that matter, currently exists. Further, there is no satisfactory method for making multiple-region cemented carbide articles. Furthermore, there are no satisfactory monolithic cemented carbide articles let alone multiple-region cemented carbide articles that exhibit superior performance under compressive stresses and additionally exhibiting superior strengths capable of surviving the tensile stresses or fatigue resulting due to the compressive stresses. Moreover, there are no satisfactory methods for making multiple-region cemented carbide articles that exhibit superior performance under compressive stresses and additionally exhibiting superior strengths or fatigue resistance capable of surviving the tensile stresses resulting due to the compressive loading.

Some resources have been expended for "thought experiments" and merely present wishes—in that they fail to teach the methods making such multiple-region cemented carbide articles.

Other resources have been spent developing complicated methods. Some methods included the pre-engineering starting ingredients, green body geometry or both. For example, the starting ingredients used to make a multiple-region cemented carbide article are independently formed as distinct green bodies. Sometimes, the independently formed green bodies are also independently sintered and ,sometimes after grinding, assembled, for example, by soldering, brazing or shrink fitting to form a multiple-region cemented carbide article. Other times, independently formed green bodies are assembled and then sintered. The different combinations of the same ingredients that comprise the independently formed green bodies respond to sintering differently. Each combination of ingredients shrinks uniquely. Each combination of ingredients responds uniquely to a sintering temperature, time, atmosphere, or any combination of the preceding. Only the complex pre-engineering of forming dies and, thus, greenbody dimensions allows assembly followed by sintering. To allow the pre-engineering, an extensive data base containing the ingredients response to different temperatures, times, atmospheres, or any combination of the preceding is required. The building and maintaining of such a data base are cost prohibitive. To avoid those costs, elaborate process control equipment might be used. This too is expensive. Further, when using elaborate process control equipment, minor deviations from prescribed processing parameters rather than yielding useful multiple-region cemented carbide articles—yield scrap.

Still other resources have been expended on laborious methods for forming multiple-region cemented carbide articles. For example, substoichiometric monolithic cemented carbide articles are initially sintered. Their compositions are deficient with respect to carbon and thus the cemented carbides contain eta-phase. The monolithic cemented carbide articles are then subjected to a carburizing environment that reacts to eliminate the eta-phase from a periphery of each article. These methods, in addition to the pre-engineering of the ingredients, require intermediate processing steps and carburizing equipment.

For the foregoing reasons, there exists a need for multiple-region cemented carbide articles and multiple-region cermet articles that can be inexpensively manufactured. Further, there exists a need for multiple-region cemented carbide articles and multiple-region cermet articles that exhibit superior performance under compressive stresses and additionally exhibiting superior strengths capable of surviving the tensile stresses resulting due to the compressive stresses and which can be inexpensively manufactured.

SUMMARY

The present invention relates to articles comprising cermets, preferably cemented carbides, having at least two regions exhibiting at least one different property. The present invention is further related to the methods of using and making these unique and novel articles.

The present invention satisfies a long-felt need in the cermet art for improved cermet material systems by providing articles having at least two regions having at least one property that differs and preferably further exhibiting resistance to fracture to impart extended life on the article when compressively loaded in a manner that either creates tensile stresses or situations that exceed the fatigue limit of a monolithic material. An example includes cermet articles having at least one leading edge or portion that exhibits tensile fracture resistance, fatigue resistance, or both and an adjacent region that exhibits suitable compressive strength.

The present invention provides a method for making the present articles by recognizing the solution to the problems encountered in making multiple-region articles. Historically, attempts at making multiple-region articles failed due to defects (e.g., green body cracking during sintering) arising during the articles' densification. Thus, the articles of the present invention are manufactured by methods that capitalized on the synergistic effects of processing parameters (e.g., differential carbide grain size or differential carbide chemistry or differential binder content or differential binder chemistry, differential percentage magnetic saturation, or any combination of the preceding) to achieve unique and novel multiple-region articles. These articles have an extended useful life relative to the useful life of prior art articles in such applications as, for example, compressive loading that induces tensile stresses within the cermet.

In an embodiment, adjustments are made to each powder blend to tailor the magnetic saturation of each (magnetic saturation alternately may be expressed as percentage magnetic saturation, e.g., 100 percent magnetic saturation (%MS) for WC—Co equals 17,870 gauss/cm3). Then the powder blends are juxtaposed at a temperature for a time and optionally at a pressure, to control binder migration among each powder blend to form a continuous and smooth transition of binder content between the resultant at least two regions, and autogeneously form a metallurgical bond between the resultant at least two regions. The magnetic saturation or percentage magnetic saturation of each powder blend may be tailored to a desired value by adding a source of ceramic component, binder component, or both. As a further example, in the tungsten carbide cobalt system the magnetic saturation or percentage magnetic saturation of each powder blend is adjusted such that full densification of each powder blend occurs and the binder migration among each powder blend is controlled to form a continuous and smooth transition between the at least two regions. Preferably, a powder blend comprising a greater amount of binder has a lower magnetic saturation or percentage magnetic saturation of than a powder blend comprising a lesser amount of binder. For example, a powder blend comprising a greater amount of binder may have a percentage magnetic saturation at least about six(6) percentage points less than a powder blend comprising a lesser amount of binder(i.e., at least one additional or second powder blend).

The unique and novel articles of the present invention comprise at least two regions, and may comprise multiple regions. A first region comprises a first ceramic component, preferably carbide(s), having a first grain size and a prescribed binder content. A second region of the article, juxtaposing or adjoining the first region, comprises a second ceramic component, preferably carbide(s), having a second grain size substantially the same as the grain size of the first region and a second binder content less than the binder content of the first region. The first region of the present articles may be more resistant to fracture, fatigue, or both than the second region and in a preferred embodiment is more resistant.

In an embodiment of the present invention, at least one property of each of the at least two regions is tailored by varying the ceramic component grain size or the ceramic component chemistry or the binder content or the binder chemistry or any combination of the preceding. Preferably, the binder content, on average, transitions continuously and smoothly between the at least two regions. The at least one property may include any of density, color, appearance, reactivity, electrical conductivity, strength, fracture toughness, elastic modulus, shear modulus, hardness, thermal conductivity, coefficient of thermal expansion, specific heat, magnetic susceptibility, coefficient of friction, wear resistance, impact resistance, chemical resistance, etc., or any combination of the preceding.

In an embodiment of the present invention, the amount of the at least two regions may be varied. For example, the thickness of the first region relative to the thickness of the second region may vary from the first region comprising a coating on the second region to the second region comprising a coating on the first region. Preferably, the first region is positioned in a portion of an article in which, for a monolithic cermet, failure would otherwise initiate. Naturally, the first region and second region may exist in substantially equal proportions.

In an embodiment of the present invention, the juxtaposition of the first region and the second region may exist as a planar interface or a curved interface or a complex interface or any combination of the preceding. Furthermore, the first region may either totally envelop or be enveloped by the second region.

In an embodiment of the present invention, the articles of the invention may be used for materials processing including, for example, machining ( included uncoated and coated materials cutting inserts), mining, construction, compression technology, extrusion technology, supercritical processing technology, chemical processing technology, materials processing technology, and ultrahigh pressure technology. Some specific examples include compressor plungers, for example, for extrusion, pressurization, and polymer synthesis; cold extrusion punches, for example, for forming wrist pins, bearing races, valve tappets, sparkplug shells, cans, bearing retainer cups, and propeller shaft ends; wire flattening or tube forming rolls; dies, for example, for metal forming, powder compaction including ceramic, metal, polymer, or combinations thereof; feed rolls; grippers; and components for ultrahigh pressure technology.

An embodiment of the present invention relates to the novel method of making the present novel and unique articles. That is, at least a first powder blend and a second powder blend are arranged in a prescribed manner to form a green body. If the shape of the green body does not correspond substantially to the shape of the final article, then the green body may be formed into a desired shape, for example, by green machining or plastically deforming or sculpting the green body or by any other means. The green body, whether or not shaped, may then be densified to form a cermet, preferably a cemented carbide article. If the densified article has not been pre-shaped or when additional shaping is desired, the densified article may be subjected to a grinding or other machining operations.

In an embodiment of the present invention, the constituents of a first powder blend and a second powder blend may be selected such that the resultant article exhibits the characteristic discussed above. For example, the amount or content of the binder of the first powder blend is relatively greater than the amount or content of the binder of the second powder blend. Furthermore, the binder chemistry or the ceramic component chemistry, preferably carbide(s) chemistry, or both may be substantially the same, substantially different or vary continuously between the at least two powder blends.

DETAILED DESCRIPTION

Articles of the present invention are described with reference to a hypothetical article 101 depicted in FIG. 1. Line A—A in FIG. 1 may represent, for example, a boundary or surface of an article, a plane of mirror symmetry, an axis of cylindrical or rotational symmetry, etc. In the following discussion, it is assumed that line A—A is a axis of cylindrical or rotational symmetry. It will be apparent to an artisan skilled in the art that the following discussion may be extended to articles having complex geometry. Thus, the following discussion should not be construed as limiting but, rather, as a starting point.

Figure 1:
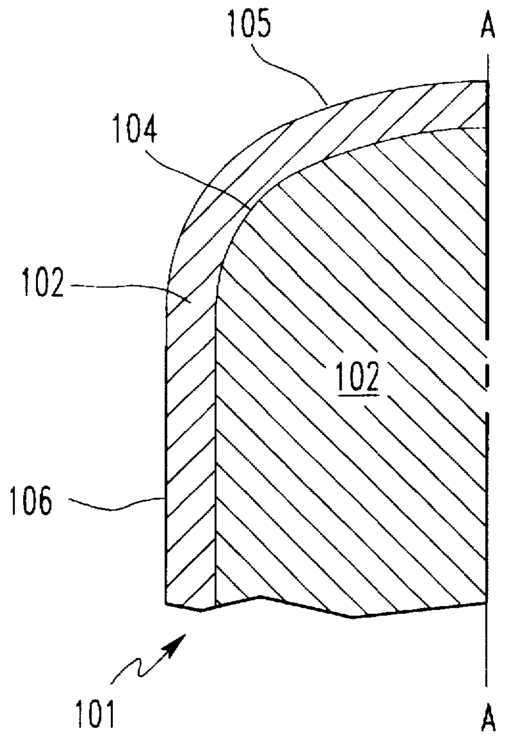
FIG. 1 is a cross-sectional schematic of a general article 101 comprising a first region 102 and a second or an at least one additional region 103 in accordance with the present invention.

In reference to FIG. 1, article 101 has a first region 102 adjoining and integral with a second or at least one additional region 103. It will be understood by an artisan skilled in the art that multiple regions may be included in an article of the present invention. Interface 104 identifies a boundary of the adjoining at least two regions. In a preferred embodiment, interface 104 is autogeneously formed. Furthermore, interface 104 preferably is not a stepwise transition but, rather, a continuous or smooth transition between the first region 102 and the at least one additional region 103. Additionally, interface 104 may be indistinguishable from first region 102 because of the continuous or smooth transition between the first region 102 and the at least one additional region 103. Article 101 may further comprise a leading surface 105 and a recessed surface 106 defined by at least a portion of the material of the first region 102 as shown in FIG. 1. As an alternative, recessed surface 106 may be defined by at least a portion of the material of the second or at least one additional region 103 (not shown).

Compositionally, the materials comprising the at least two regions comprise cermets. Such cermets comprise at least one ceramic component and at least one binder. The ceramic component of each region may be the same or different. Ceramic components comprise at least one of boride(s), carbide(s), nitride(s), oxide(s), silicide(s), their mixtures, their solutions or any combination of the proceeding. The metal of the at least one of borides, carbide, nitrides, oxides, or silicides include one or more metals from International Union of Pure and Applied Chemistry (IUPAC) groups 2, 3 (including lanthanides and actinides), 4, 5, 6, 7, 8, 9, 10, 11, 12, 13 and 14. Preferably, the at least one ceramic component comprises carbide(s), their mixtures, their solutions or any combination of the proceeding. The metal of the carbide (s) comprises one or more metals from IUPAC groups 3 (including lanthanides and actinides), 4, 5, and 6; more preferably one or more of Ti, Zr, Hf, V, Nb, Ta, Cr, Mo and W; and even more preferably, tungsten.

The binder of each region may be the same or different and may comprise any one of metals, glasses or ceramics (i.e., any material that forms or assists in forming a liquid phase during liquid phase sintering). Preferably, the binder comprises one or more metals from IUPAC groups 8, 9 and 10; more preferably, one or more of iron, nickel, cobalt, their mixtures, and their alloys; and even more preferably, cobalt or cobalt alloys such as cobalt-tungsten alloys. Binders comprise single metals, mixtures of metals, alloys of metals or any combination of the preceding.

Dimensionally, the size of the ceramic component, preferably carbide(s), of the at least two regions may range in size from submicrometer to about 420 micrometers or greater. Submicrometer includes nanostructured material having structural features ranging from about 1 nanometer to about 100 nanometers or more. Although the average grain size of the ceramic component, preferably carbide(s), of each region may differ, in a preferred embodiment, the average grain size of the ceramic component, preferably carbide(s), of each region is substantially the same.

In a preferred embodiment, the grain size of the ceramic component, preferably carbide(s) and more preferably, tungsten carbides, of the at least two regions ranges from about 0.1 micrometer to about 30 micrometers or greater with possibly a scattering of grain sizes measuring, generally, in the order of about 40 micrometers and preferably from about 0.1 micrometer to about 10 micrometers or greater with possibly a scattering of grain sizes measuring, generally, in the order of about 20 micrometers while the average grain size ranges from about 0.5 micrometers to about 10 micrometers and preferably, from about 0.5 micrometers to about 2.

In general, the ceramic component grain size and the binder content may be correlated to the mean free path of the binder by quantitative metallographic techniques such as those described in "Metallography, Principles and Practice" by George F. Vander Voort (copyrighted in 1984 by McGraw Hill Book Company, New York, N.Y.). Other methods for determining the hard component grain size included visual comparison and classification techniques such as those discussed in ASTM designation: B 390-92 entitled "Standard Practice for Evaluating Apparent Grain Size and Distribution of Cemented Tungsten Carbide," approved January 1992 by the American Society for Testing and Materials, Philadelphia, Pa. The results of these methods provide apparent grain size and apparent grain size distributions.

In a preferred embodiment relating to ferromagnetic binders, the average grain size of the ceramic component, preferably carbide and more preferably tungsten carbide, may be correlated to the weight percent binder ($X_b$), the theoretical density (ρth, grams per cubic centimeter) of the cermet and the coercive force (Hc, kiloampere-turn per meter (kA/m)) of a homogeneous region of a sintered article as described by R. Porat and J. Malek in an article entitled "Binder Mean-Free-Path Determination in Cemented Carbide by Coercive Force and Material Composition," published in the proceedings of the Third International Conference of the Science of Hard Materials, Nassau, the Bahamas, Nov. 9–13, 1987, by Elsevier Applied Science and edited by V. K. Sarin. For a cobalt bound tungsten carbide article, the calculated average grain size, δ micrometers, of the tungsten carbide is given by equation 1, $$\delta = 0.3\left[\frac{80}{H_c}\right]^{(164.822/X_{Co}\rho th)^{1/3}} \qquad (1)$$

In a preferred embodiment, the binder content of the first region comprises, on average, by weight, from about 2 percent to about 25 percent or more; preferably, from about 5 percent to about 25 percent; and more preferably, from about 5 percent to about 15 percent. Likewise, the binder content of the at least one additional region comprises, by weight, from about 2 percent to about 25 percent and preferably, from about 5 percent to about 12 percent. The binder content of the second region is less than that of the first region.

In a preferred embodiment, the combination of carbide grain size and binder content may be correlated to a binder mean free path size, λ, as discussed generally by Vander Voort and particularly for ferromagnetic materials by Porat and Malek. The binder mean free path (λ micrometers) in an article having a ferromagnetic metallic binder is a function of the weight percent binder ($X_b$), coercive force ($H_c$, kiloampere-turn per meter (kA/m), and the theoretical density (ρth, grams per cubic centimeter) of a homogeneous region of the densified article. For a cobalt bound tungsten carbide article, the mean free path, λ, of the cobalt binder is given by the equation 2, $$\lambda = \frac{0.3X_{Co}\rho th}{890 - X_{Co}\rho th}\left(\frac{80}{Hc}\right)^{(164.822/X_{Co}\rho th)^{1/3}} \qquad (2)$$

In a preferred embodiment, the binder mean free path size in the first region ranges from about 0.1 micrometers to about 1.0 micrometers, while the mean free path size of the at least one additional region ranges from about 0.05 micrometers to about 1.0 micrometers and preferably comprises about 0.12 micrometers.

Figure 2A:
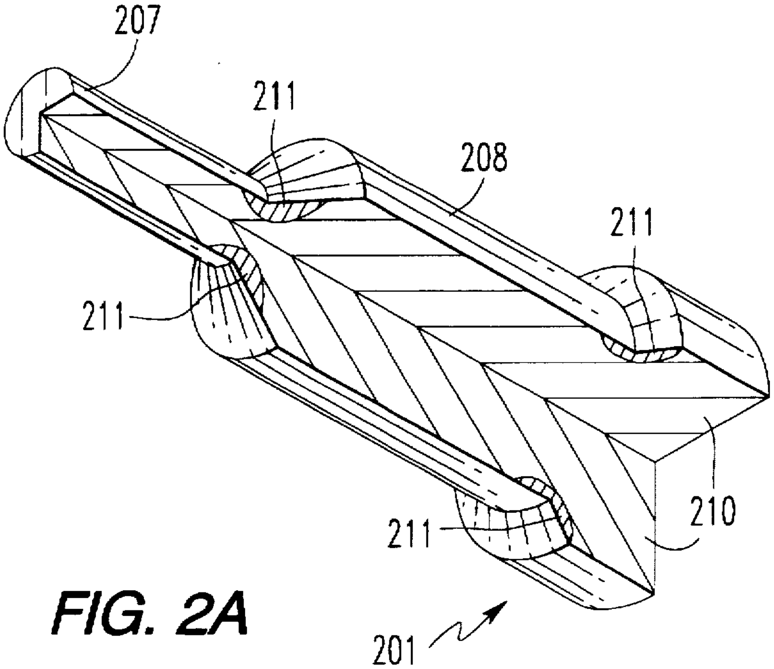
FIGS. 2A, 2B, and 2C are examples of schematic cut away views of possible geometries of articles or portions of articles encompassed by the present invention.
Figure 2B:
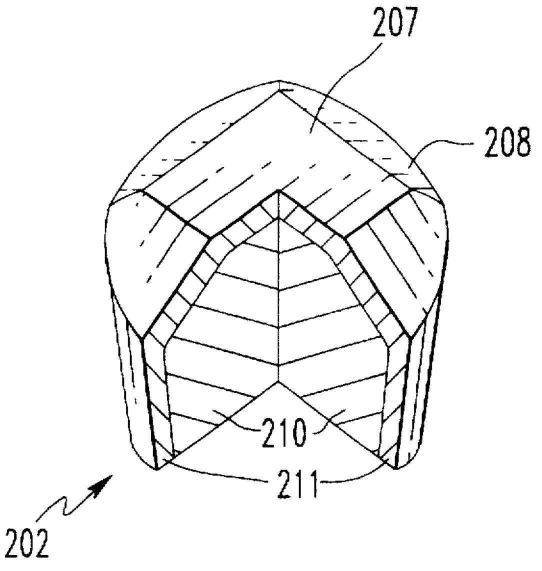
Figure 2C:
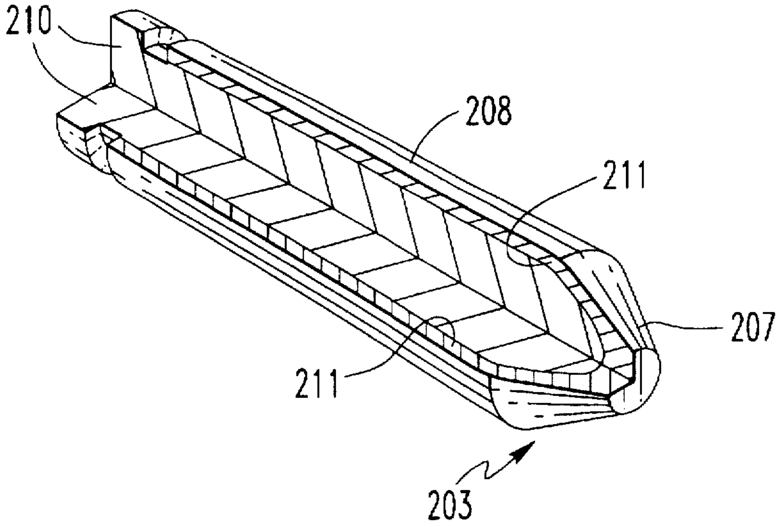

The solid geometric shape of an article may be simple or complex or any combination of both. Solid geometric shapes include cubic, parallelepiped, pyramidal, frustum of a pyramid, cylinder, hollow cylinder, cone, frustum of a cone, sphere (including zones, segments and sectors of a sphere and a sphere with cylindrical or conical bores), torus, sliced cylinder, ungula, barrel, prismoid, ellipsoid and combinations thereof. Likewise, cross-sections of such articles may be simple or complex or combinations of both. Such shapes may include polygons (e.g., squares, rectangles, parallelograms, trapezium, triangles, pentagons, hexagons, etc.), circles, annulus, ellipses and combinations thereof. FIGS. 2A, 2B, and 2C illustrate combinations of a first region 211, a second region 210 incorporated in various solid geometries. These figures are cut-away sections of the articles or portions of articles (impact extrusion punches and dies in FIG. 2A; cubic anvil in FIG. 2B; and compressor plunger FIG. 2C) and further demonstrate a leading edge or surface 207, and an outer or rearward surface 208.

Again, with reference to FIG. 1, the interface 104 defining the boundary between the first region 102 and the second region 103 may divide the article 101 in a symmetric manner or an asymmetric manner or may only partially divide the article 101. In this manner, the ratios of the volume of the first region 102 and the at least one additional region 103 may be varied to engineer the most optimum bulk properties for the article 101. In a preferred embodiment, the ratio of the volume of the first region 102 to the volume of the second region 103 ranges from about 0.01 to about 1.0; preferably, from about 0.02 to about 0.5; and more preferably, from about 0.02 to about 0.1.

The novel articles of the present invention are formed by providing a first powder blend and at least one additional powder blend or a second powder blend. It will be apparent to an artisan skilled in the art that multiple powder blends may be provided. Each powder blend comprises at least one ceramic component, at least one binder, at least one lube (an organic or inorganic material that facilitates the consolidations or agglomeration of the at least one ceramic component and at least one binder), and optionally, at least one surfactant. Methods for preparing each powder blend may include, for example, milling with rods or cycloids followed by mixing and then drying in a sigma blade type dryer or spray dryer. In any case, each powder blend is prepared by a means that is compatible with the consolidation or densification means or both when both are employed.

The at least two powder blends comprise a ceramic component, preferably carbide(s), having a preselected particle size or particle size distribution. Particle sizes may range from about submicrometer to about 420 micrometers or greater; preferably, grain sizes range from about 0.1 micrometer to about 30 micrometers or greater with possibly a scattering of particle sizes measuring, generally, in the order of about 40 micrometers and ,more preferably, from about 0.1 micrometer to about 10 micrometers or greater with possibly a scattering of particle sizes measuring, generally, in the order of about 20 micrometers. In these preferred particle sizes, the average particle size may range from about 0.5 micrometers to about 10 micrometers and preferably, from about 0.5 micrometers to about 2 micrometers.

A binder amount of a first powder blend is pre-selected to tailor the properties, for example, to provide sufficient resistance to fracture of the resultant first region of an article when the article is subjected to compressive loading and experiences tensile stresses in the first region. The preselected binder content may range, by weight, from about 2 percent to about 25 percent or more; preferably, from about 5 percent to about 25 percent; and more preferably, from about 10 percent to about 20 percent.

The binder in each powder blend may be any size that facilitates the formation of an article of the present invention. Suitable sizes have an average particle size less than about 5 micrometers; preferably, less than about 2.5 micrometers; and more preferably, less than about 1.8 micrometers.

One constraint on the second powder blend is that the binder amount or content is different from the binder content (either more or less binder)of the first powder blend.

The binder content of each powder blend is selected both to facilitate formation of an article and provide optimum properties to the article for its particular application. Thus, the binder content of the first powder blend may be greater than, less than or substantially equivalent to the binder content of the second powder blend. Preferably, the binder content of the second powder blend ranges, by weight, from about four (4) to about twelve (12) percentage points different from the percentage of the pre-selected binder content of the first powder blend; more preferably, about nine (9) percentage points different from the percentage of the pre-selected binder content of the first powder blend. In a preferred embodiment, the binder content of the second powder blend is, on average, less than that of the first powder blend. For example, if the preselected binder content of the first powder blend is by weight, about 15 percent, then the binder content of the second powder blend may range from about 3 percent to about 11 percent and, preferably, comprises 6 percent.

The at least two powder blends are provided in any means that allows at least a portion of each to be at least partially juxtaposed. Such means may include, for example, pouring; injection molding; extrusion, either simultaneous or sequential extrusion; tape casting; slurry casting; slip casting; sequential compaction; co-compaction; or and any combination of the preceding. Some of these methods are discussed in U.S. Pat. Nos. 4,491,559; 4,249,955; 3,888,662; and 3,850,368, which are incorporated by reference in their entirety in the present application.

During the formation of a green body, the at least two powder blends may be maintained at least partially segregated by a providing means or by a segregation means or both. Examples of providing means may include, for example, the methods discussed above while segregation means may include a physically removable partition or a chemically removable partition or both.

A physically removable partition may be as simple as a paper or other thin barrier that is placed into a die or mold during the charging of the at least two powder blends and which is removed from the die or mold after powder blend charging and prior to powder blend densification. More sophisticated physically removable partitions may include concentric or eccentric tubes (e.g., impervious or pervious sheets, screens or meshes, whether metallic or ceramic or polymeric or natural material, or any combination of the preceding). The shapes of physically removable partitions may be any that facilitate the segregation of the at least two powder blends.

A chemically removable partition includes any partition, whether in a simple or complex form or both, or pervious or impervious or combinations of both, that may be removed from or consumed by the segregated at least two powder blends by a chemical means. Such means may include leaching or pyrolysis or fugitive materials or alloying or any combination of the preceding. Chemically removable partitions facilitate the formation of articles of the present invention wherein the at least two regions, cross-sectionally as well as in regard to the solid geometry, comprise complex shapes.

In an embodiment of the present invention, the segregated and at least partially juxtaposed at least two powder blends are densified by, for example, pressing including, for example, uniaxial, biaxial, triaxial, hydrostatic, or wet bag either at room temperature or at elevated temperature (e.g., hot pressing).

In any case, whether or not consolidated, the solid geometry of the segregated and at least partially juxtaposed at least two powder blends may includes any of those discussed above in regard to the geometry of an multiple-region article. To achieve the direct shape or combinations of shapes, the segregated and at least partially juxtaposed at least two powder blends may be formed prior to or after densification or both. Prior forming techniques may include any of the above mentioned providing means as well as green machining or plastically deforming the green body or their combinations. Forming after densification may include grinding or any machining operations.

The cross-sectional profile of a green body may be simple or complex or combinations of both and include those discussed above in regard to the cross-section of a multiple region article.

The green body comprising the segregated and at least partially juxtaposed at least two powder blends is then densified by liquid phase sintering. Densification may include any means that is compatible with making an article of the present invention. Such means include vacuum sintering, pressure sintering, hot isostatic pressing (HIPping), etc. These means are performed at a temperature and/or pressure sufficient to produce a substantially theoretically dense article having minimal porosity. For example, for tungsten carbide-cobalt articles, such temperatures may include temperatures ranging from about 1300° C. (2373° F.) to about 1650° C. (3002° F.); preferably, from about 1300° C. (2373° F.) to about 1400° C. (2552° F.); and more preferably, from about 1350° C. (2462° F.) to about 1400° C. (2552° F.). Densification pressures may range from about zero (0) kPa (zero (0) psi) to about 206,850 kPa (30,000 psi). For carbide articles, pressure sintering may be performed at from about 1,723 kPa (250 psi) to about 13,790 kPa (2000 psi) at temperatures from about 1370° C. (2498° F.) to about 1540° C. (2804° F.), while HIPping may be performed at from about 58,950 kPa (10,000 psi) to about 206,850 kPa (30,000 psi) at temperatures from about 1,310° C. (2373° F.) to about 1430° C. (2606° F.).

Densification may be done in the absence of an atmosphere, i.e., vacuum; or in an inert atmosphere, e.g., one or more gasses of IUPAC group 18; in carburizing atmospheres; in nitrogenous atmospheres, e.g., nitrogen, forming gas (96% nitrogen, 4% hydrogen), ammonia, etc.; or in a reducing gas mixture, e.g., $H_2/H_2O$, $CO/CO_2$, $CO/H_2/CO_2/H_2O$, etc.; or any combination of the preceding.

In an effort to explain the workings of the present invention, but without wishing to be bound by any particular theory or explanation for the present invention, it appears as though when a green body is liquid phase sintered, binder from the first powder blend migrates by capillary wetting into the second powder blend. With regard to the capillary migration mechanism, metal binders, particularly in carbide-cobalt systems, may wet ceramic component particles readily. The binder content difference between the first powder blend and the second powder blend provides a driving force for a molten binder to migrate from the first powder blend to the second powder blend.

The present invention is illustrated by the following Examples. These Examples are provided to demonstrate and clarify various aspects of the present invention. The Examples should not be construed as limiting the scope of the claimed invention.

EXAMPLE 1

The present Example demonstrates, among other things, a method of making a near-net-shape article comprised of a first region and at least one additional region. More particularly, the present Example demonstrates the method for formation of and an article having a fracture resistant or fatigue resistant region on at least a portion of at least one surface.

TABLE 1

| | First | | Second | | Sintering Parameters | | | |
|---|---|---|---|---|---|---|---|---|
| Sample | Powder | | Powder | | | Time | | Fig. |
| No. | Co* | % MS | Co* | % MS | Temp. °C. (°F.) | (hr.) | Results | No. |
| 1 | 12 | 87.4 | 6 | 76.0 | 1477 (2690) | 9.0 | No Gradient | 4 |
| 2 | 12 | 87.4 | 6 | 76.0 | 1371 (2500) | 0.75 | 2.5% Gradient& | 5 |
| 3 | 12 | 84.3 | 6 | 90.5 | 1441 (2625) | 1.5 | <1% Gradient | 6 |
| 4 | 12 | 84.3 | 6 | 90.5 | 1371 (2500) | 0.75 | 3% Gradient | 7 |
| 5 | 12 | 80.8 | 6 | 90.5 | 1371 (2500) | 0.75 | 3.5% Gradient | 8 |
| 6 | 15 | 74.8 | 6 | 86.8 | 1371 (2500) | 0.75 | 4% Gradient | 9 |

*weight percent cobalt binder and the balance WC
@ note: 100 percent magnetic saturation (% MS) equals 17,870 gauss/cm$^3$; 1.787 tesla/cm$^3$; 2019 gauss/gram; 201.9 tesla/kilogram; or 16.1 T/kilogram
&non-monotonically decreasing-gradient Table I sets forth the binder content(Co), percentage magnetic saturation (%MS), sintering temperature (Temp.), and sintering time at temperature (Time), for a first powder blend (First Powder) and a second powder blend (Second Powder) used to make six articles. Also, Table I sets forth the percentage variation of binder content from the surface to the interior of the articles using the powder blends and the associated figure (Fig. No.) displaying the results of EDS analysis of the resultant article.

Figure 3C:
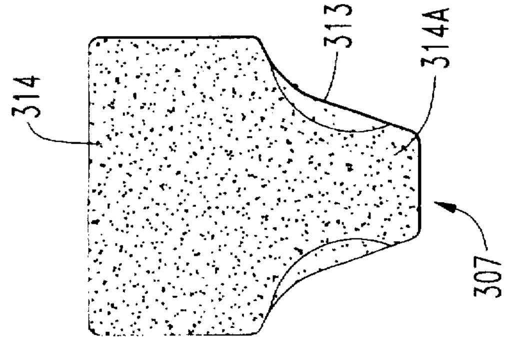
FIG. 3C is a cross-sectional schematic of a green body 307 made by the methods of Example 1.
Figure 3B:
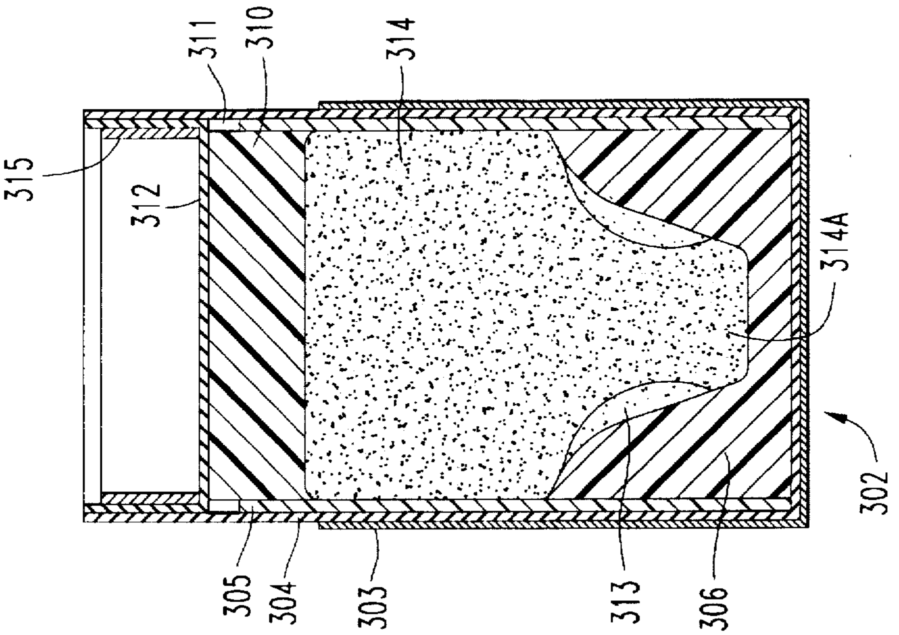
FIG. 3B is a cross-sectional schematic of an isostatic pressing configuration 302 corresponding to the methods of Example 1.

To make Samples 1–6 of the present Example a first powder blend and a second powder blend were separately prepared. The first powder blend (depicted as 313 in FIGS. 3A, 3B and 3C) and the second powder blend (depicted as 314 in FIGS. 3A, 3B, and 3C) comprised, by weight, about the percentage of commercially available extra fine cobalt binder set forth in Table I and the balance tungsten carbide (Kennametal Inc., Henderson, N.C.) to which was added about 2.15 percent paraffin wax lubricant and about 0.25 percent of surfactant. Characterization of a test sintered specimen of only the first powder blend and only the second powder blend verified that these monolithic WC—Co grades contained the weight percentage binder set forth in Table I. In both monolithic WC—Co grades, the WC average apparent grain size was less than about one micrometer. The percent magnetic saturation (%MS) summarized in Table I of these monolithic WC—Co grades were measured using a LDJ Model SM-8001 saturation induction system connected to a LDJ Model 702 magnetic multimeter (LDJ Electronics Inc., Troy, Mich.).

Figure 3A:
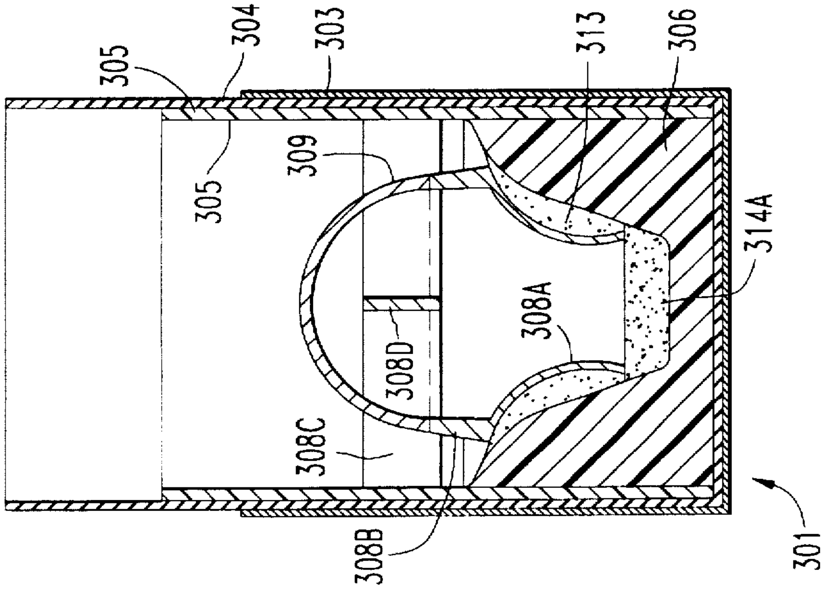
FIG. 3A is a cross-sectional schematic of a charging configuration 301 corresponding to the methods of Example 1.

To make an article, a first powder blend 313 and a second powder blend 314 were charged into a cavity of a charging configuration 301 depicted schematically in FIG. 3A (as a point of reference the cross-sectional schematic is a cutaway view just forward of the center line). Charging configuration 301 included a support chamber 303, containing means or bag 304, inner sleeve 305, a first forming means or plug 306, and a physically removable partition 308,309.

Support chamber 303 may be made from any material that provides rigidity to the containing means or bag 304 during charging and facilitates the loading of a isostatic pressing configuration 302 into an isostatic press. In the present Example, support chamber comprised commercially available perforated steel (about 40% open).

Containing means or bag 304 may comprise a polymer, preferable an elastomer (e.g., neoprene, latex, silicone or the like) having suitable elasticity, impermeability to isostatic medium or fluids, and/or wear resistance and preferably, a Shore A hardness ranging from about 40 to about 60 durometer. In the present Example, containing means or bag 304 comprised commercially available neoprene.

Inner sleeve 305 and first forming means or plug 306 provide a surface defining means for a isostatically formed multiple-region green body. As such, both may comprise a polymer, preferably an elastomer (e.g., polyurethane, silicone, or the like), having suitable elasticity and/or wear resistance and preferably, a Shore A hardness ranging from about 40 to about 90 durometer. In the present Example, inner sleeve 305 and first forming means or plug 306 comprised commercially available polyurethane.

The physically removable partition 308,309 comprised a self releasing taper portion 308A, funneling portion 308B, aligning means comprised of mutually perpendicular members 308C, 308D, and powder blend distributing means 309. The materials used to fabricate the physically removable partition 308,309 include any material (e.g., metals, polymers, natural materials such as wood, or the like). In the present Example, physically removable partition 308,309 comprised commercially available aluminum alloy. Self releasing taper portion 308A was designed to separate the first powder blend 313 and the second powder blend 314 during charging. Additionally self releasing taper portion 308A facilitated the removal of physically removable partition from the charging configuration in a manner that maintained the segregation of the powder blends. Powder blend distributing means 309 may be any shape that facilitates charging of the first powder blend 313 any thus may include any of the enumerated geometries mention in regard to the discussion relating to the multiple-region article.

In preparing each of Sample 1–6, substantially the same procedure was followed. Namely, physically removable partition 308,309 was assembled within inner sleeve 305 such that it contacted first forming means or plug 306. Then, about one kilogram (kg) (2.2 lb.) of first powder blend were charged onto powder blend distributor 309 so that the first powder blend was uniformly distributed between first forming means or plug 306 and self releasing taper 308A. After powder blend distributor 309 was the removed, about 3 kg (6.6 lbs.) of second powder blend were placed and leveled within the inner portion of self releasing taper 308. Self releasing taper 308 was then the carefully removed to allow second powder blend 314 to settle against first powder blend 313 in a prescribed manner. Finally, about 20 kg (44.1 lbs.) of second powder blend 314 charged into the inner sleeve 305 to complete the arrangement of the two powder blends.

An isostatic pressing configuration 302 (depicted in FIG. 3B), which incorporated charging configuration was then assembled. The isostatic pressing configuration 302 further comprised a second forming means or plug 310, sealing means or cap 312, an entrained gas accommodating cavity 311, and a seal facilitating means or member 315. Isostatic pressing configuration 302 (depicted in FIG. 3B) may also be used to form near-net-shape monolithic articles.

Second forming means or plug 310 provides a surface defining means for a isostatically formed multiple-region green body. As such, it may comprise a polymer, preferably an elastomer (e.g., polyurethane, silicone, or the like), having suitable elasticity and/or wear resistance and preferably, a Shore A hardness ranging from about 40 to about 90 durometer. In the present Example, second forming means or plug 310 comprised commercially available polyurethane.

Sealing means or cap 312 may comprise a polymer, preferable an elastomer (e.g., neoprene, latex, silicone or the like) having suitable elasticity, impermeability to isostatic medium or fluids, and/or wear resistance and preferably, a Shore A hardness ranging from about 40 to about 60 durometer. In the present Example, sealing means or cap 312 comprised commercially available neoprene.

The materials used to fabricate seal facilitating means or member 315 include any that would survive isostatic pressing (e.g., metals, polymers, natural materials such as wood, or the like). In the present Example, seal facilitating means or member 315 comprised commercially available aluminum alloy.

After assembly, isostatic pressing configuration 302 was place into an isostatic press which was pressurized to about 172,375 kilopascal (kPa)(25,000 pound per square inch (psi)) to produce a multiple-region green body 307 (depicted in FIG. 3C) with the region comprised of the first powder blend at a thickness of about 7.6 mm (0.3 inch). During pressurization, the cooperation of the components of the pressing configuration 302 facilitated the removal of entrained gasses from within the powder blends.

Each multiple-region greenbody was placed in a sintering furnace. At about room temperature the furnace and its contents were evacuated to establish that the furnace was sufficiently leak free and then flowing hydrogen was introduced to establish and maintain a hydrogen pressure of about 110 kilopascal (kPa) (820 torr). While maintaining the flowing hydrogen and pressure, the furnace was raised from about room temperature to about 427° C. (800° F.) in about 3 hours; held at about 427° C. (800° F.) for about two(2) hours; heated from about 427° C. (800° F.) to about 510° C. (950° F.) in about 3.3 hours; held at about 510° C. (950° F.) for about two(2) hours; then flowing hydrogen discontinued, and the furnace was evacuated using mechanical pumps while heating from about 510° C. (950° F.) to about 1288° C. (2350° F.); after about 0.5 hours at about 1288° C. (2350° F.)the vacuum pumps were disengaged and argon was introduced at a pressure of about 2 kPa (15 torr); then heated from about 1,288° C. (2350° F.) to about the temperature noted in Table I at about 3.3° C. (6° F.) per minute; held at about the temperature noted in Table I for about the time period noted in Table I; during the last minutes of the time period noted in Table, argon was introduced to about a pressure of about 5,516 kPa (800 psi) and held at that pressure for about 5 minutes; and then the power to the furnace was turned off and the furnace and its contents were allowed to cool to about room temperature at about 5.6° C. (10° F.) per minute.

After sintering, each of Samples 1–6 were then hot isostatically consolidated at a temperature of about 14°–28° C. (25°–50° F.) lower than the sintering temperature and at a pressure of about 113,800 kPa (16,500 psi) for about 0.5 hours.

To understand the interaction of sintering time, sintering temperature, powder blend binder content and powder blend percentage magnetic saturation Samples 1–6 were cross-sectioned, ground, and polished. The ground and polished sample was analyzed by standardless spot probe analysis using energy dispersive x-ray analysis (EDS) from the surface originally comprising the first powder blend into the body originally comprising the second powder blend. Specifically, a JSM-6400 scanning electron microscope (Model No. ISM64-3, JEOL LTD, Tokyo, Japan) equipped with a $LaB_6$ cathode electron gun system and an energy dispersive x-ray system with a silicon-lithium detector (Oxford Instruments Inc., Analytical System Division, Microanalysis Group, Bucks, England) at an accelerating potential of about 20 keV was used. The scanned areas measured about 125 micrometers by about 4 micrometers. Each area was scanned for an equivalent time interval (about 50 seconds live time). The step size between adjacent areas was about that reported by the results displayed in FIGS. 4–9.

Figure 4:
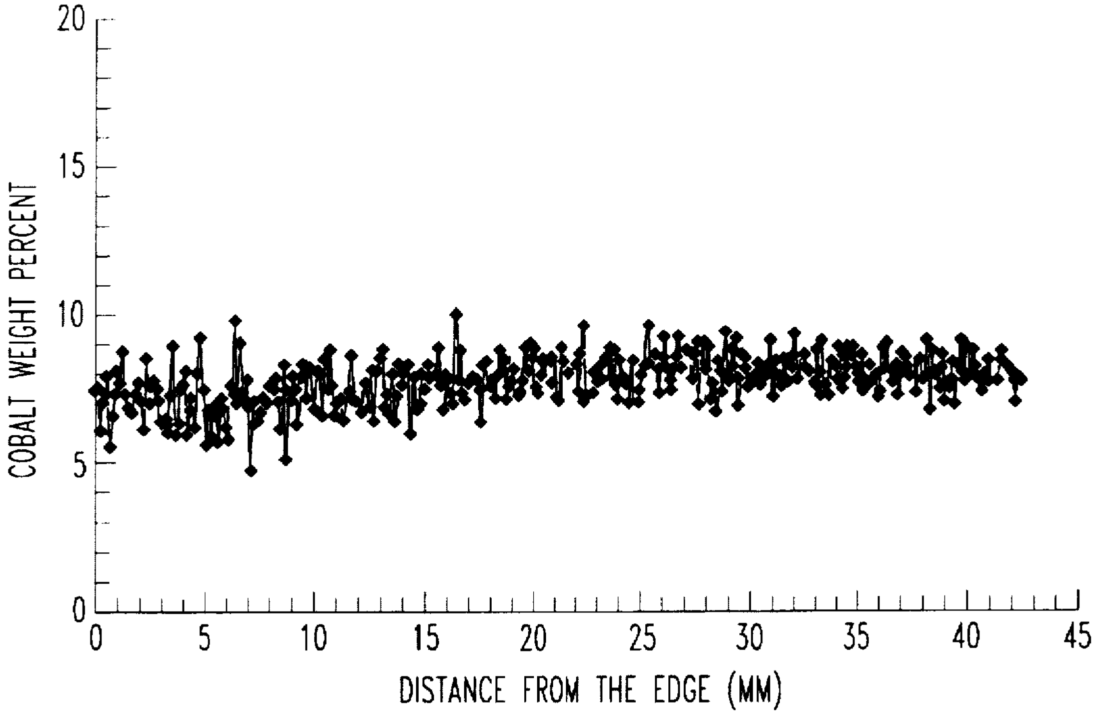
FIGS. 4, 5, 6, 7, 8, and 9 correspond to the results of binder concentration determinations using energy dispersive spectroscopy (EDS) techniques as a function of distance for Sample Nos. 1, 2, 3, 4, 5, and 6 of Example 1.
Figure 5:
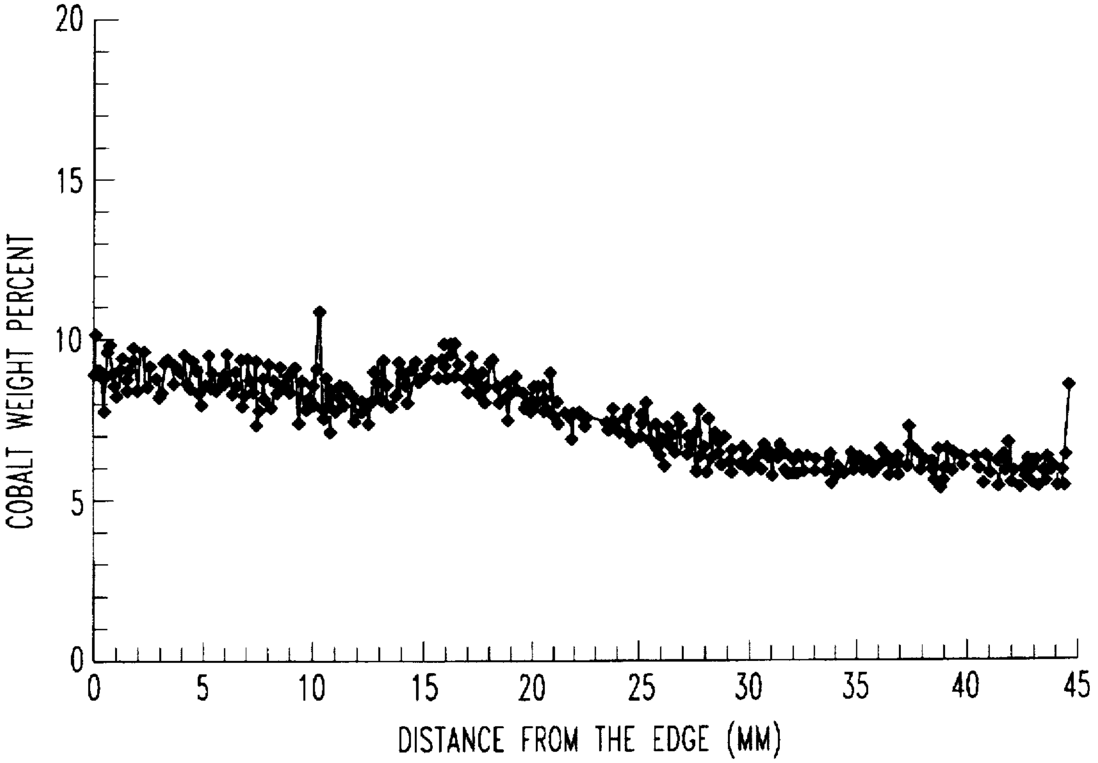
Figure 6:
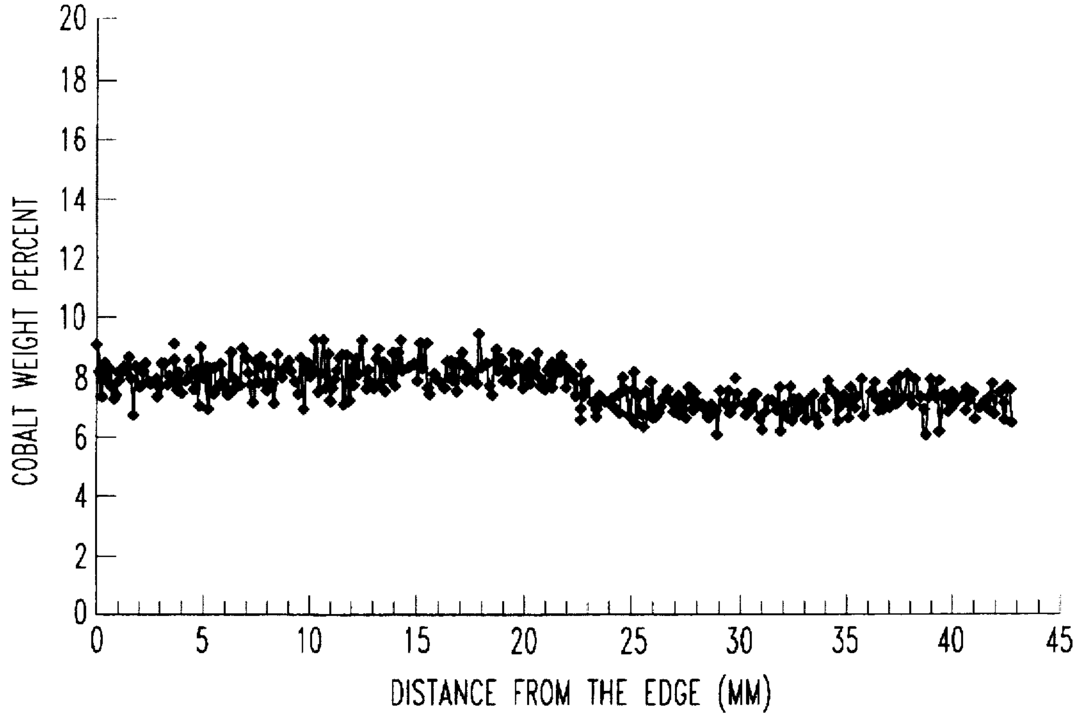
Figure 7:
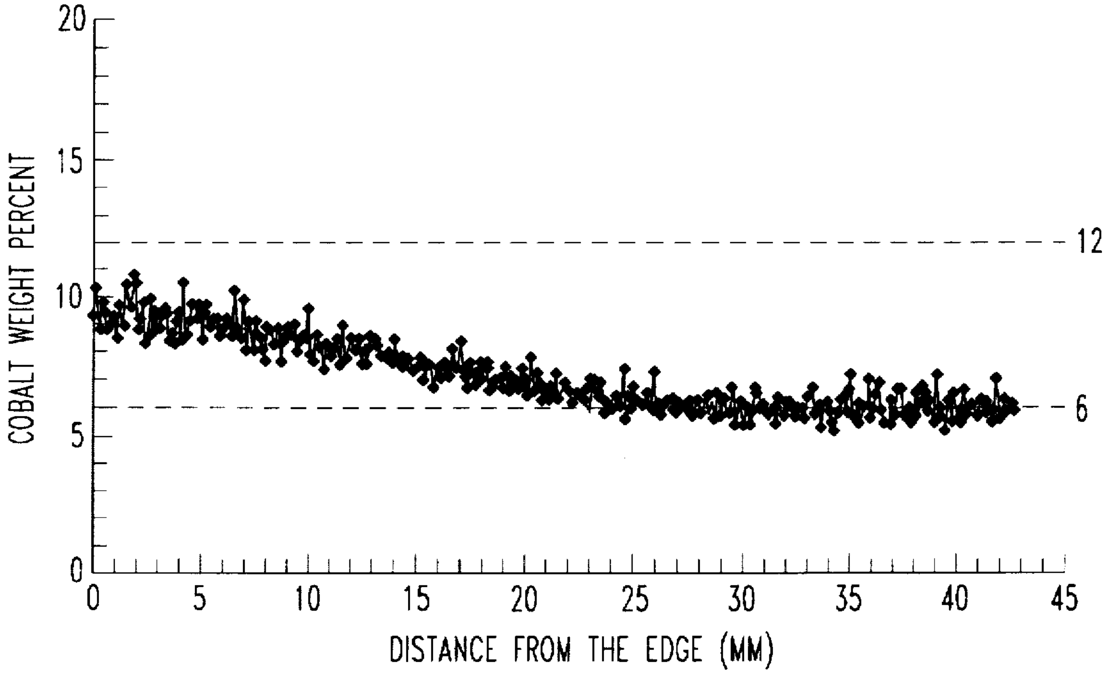
Figure 8:
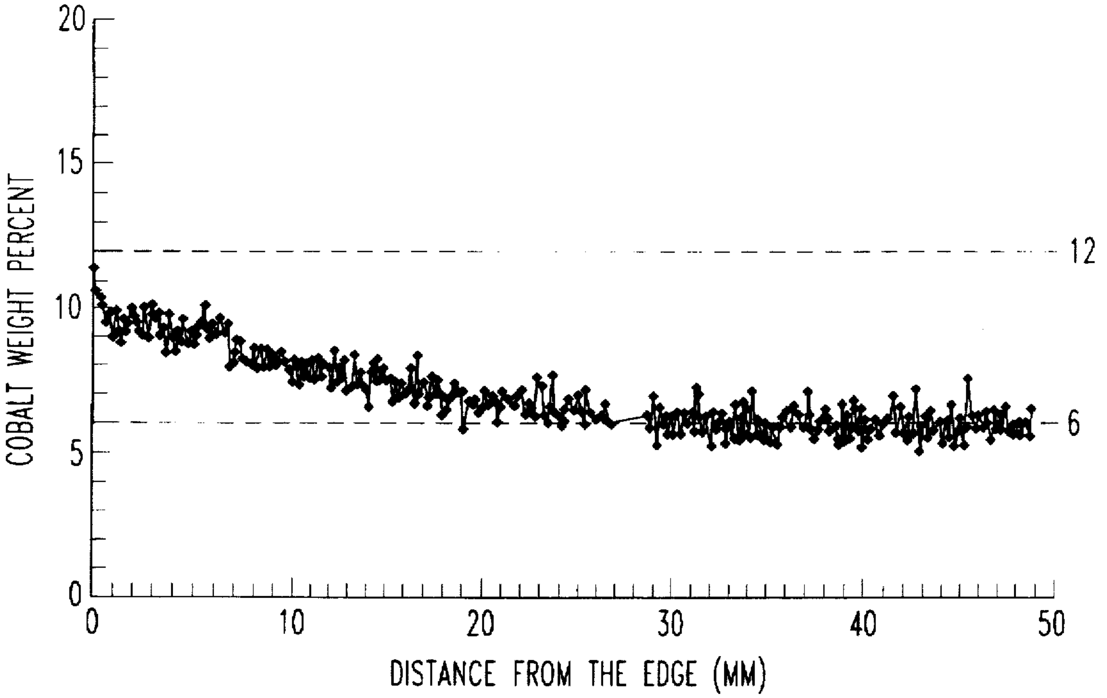
Figure 9:
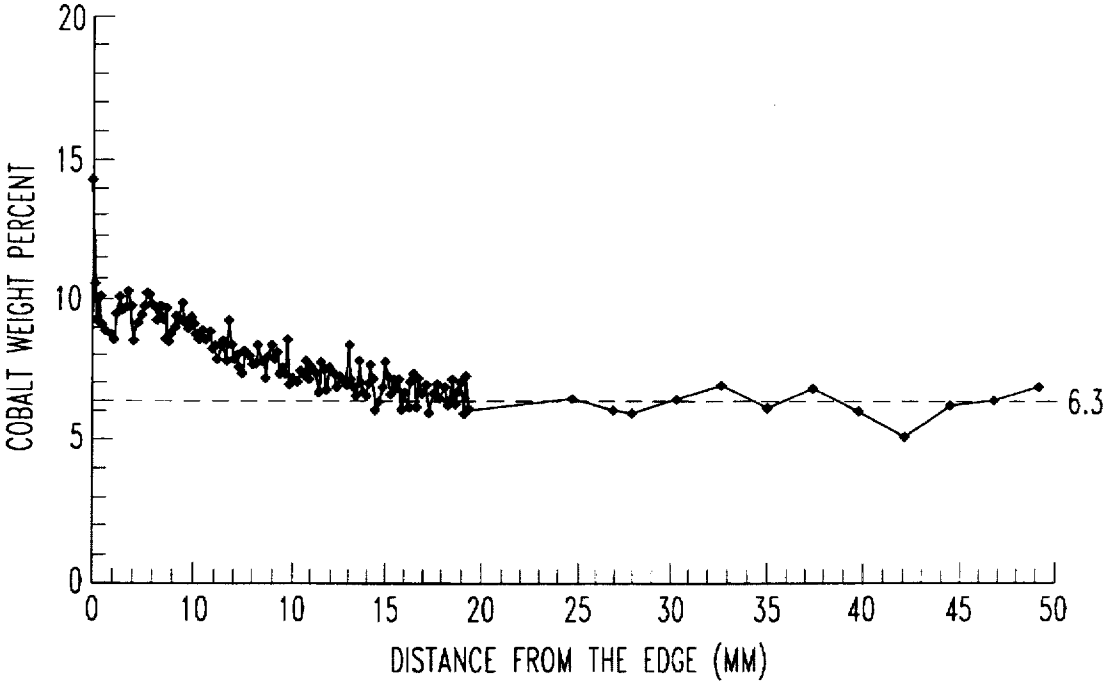

That is FIG. 4 demonstrates essentially no difference between the weight percent cobalt at the edge and the interior of Sample 1. FIG. 5 demonstrates a difference between the weight percent cobalt at the edge and the interior of Sample 2 of about 2.5; however the transition is not monotonically decreasing. FIG. 6 demonstrates a difference between the weight percent cobalt at the edge and the interior of Sample 3 of less than about one. FIG. 7 demonstrates a difference between the weight percent cobalt at the edge and the interior of Sample 4 of about three, with a steady state value being reached at about 25 mm (1 inch) from the edge. FIG. 8 demonstrates a difference between the weight percent cobalt at the edge and the interior of Sample 5 of about 3.5., with a steady state value being reached at about 25 mm (1 inch) from the edge. FIG. 9 demonstrates a difference between the weight percent cobalt at the edge and the interior of Sample 6 of about four, with a steady state value being reached at about 15 mm (0.6 inch) from the edge.

What is claimed is:

1. A method for forming a multiple-region shaped green body, comprising the steps of:

forming an isostatic pressing configuration by a process comprising the steps of:

providing a containing means having an opening, a first inner surface, and a second outer surface transitioning to said first inner surface at said opening, wherein said containing means comprises a polymer impermeable to an isostatic fluid;

providing a first forming means within said containing means so as to contact at least a portion of said first inner surface of said containing means, wherein said first forming means has a prescribed configuration for defining at least a portion of said multiple-region shaped green body and said first forming means comprises a polymer;

charging a first powder blend comprising a first ceramic component, a lube, and a first metal binder component into said containing means and in contact with at least a portion of said first forming means;

charging at least one additional powder blend comprising a second ceramic component, a lube, and a second metal binder component into said containing means and in contact with at least a portion of said first powder blend;

providing a second forming means within said containing means so as to contact at least another portion of said first inner surface of said containing means, wherein said second forming means has a prescribed configuration for defining at least another portion of said multiple-region shaped green body and said second forming means comprises a polymer;

providing a sealing means having a first surface and a second surface, said first surface of said sealing means contacting at least a portion of said first inner surface of said containing means near said opening of said containing means, wherein said sealing means comprises a polymer; and providing a seal facilitating means contacting said second surface of said sealing means; and isostatically pressing said isostatic pressing configuration to remove any entrained gasses from within said powder blends and said containing means during pressurization thereby consolidating said powder blends to form said multiple-region shaped green body.

2. The method of claim 1, wherein said polymer comprising said containing means and sealing means comprises neoprene, latex, or silicone.

3. The method of claim 1, wherein said polymer comprising said forming means comprises polyurethane.

4. The method of claim 1, wherein said seal facilitating means comprises a polymer, a metal, or a natural material.

5. The a method of claim 1, wherein said first and second ceramic components are the same or different and comprise at least one of boride(s), carbide(s), nitride(s), oxide(s), silicide(s), their mixtures, their solutions, and combinations thereof.

6. The method of claim 5, wherein said multiple-region shaped green body further comprises at least one leading surface.

7. The method of claim 5, wherein said first and second ceramic component particles are the same or different and comprise at least one carbide of one or more of Ti, Zr, Hf, V, Nb, Ta, Cr, Mo, and W.

8. The method of claim 7, wherein said at least one carbide comprises tungsten carbide.

9. The method of claim 8, wherein said first and second ceramic component particle size ranges from about submicrometer to about 30 micrometers.

10. The method of claim 5, wherein said first and second ceramic component particle size ranges from about 0.1 micrometer to about 10 micrometers.

11. The method of claim 10, wherein said first and second ceramic component particle size ranges from about 0.5 micrometer to about 2 micrometers.

12. The method of claim 5, wherein said first and second ceramic component particle size ranges from about 0.5 micrometer to about 10 micrometers.

13. The method of claim 5, wherein said metal binder of said first powder blend and said at least one additional powder blend are the same or different and comprise one or more of iron, nickel, cobalt, their mixtures, or their alloys.

14. The method of claim 13, wherein said metal binder of said first powder blend and said at least one additional powder blend consists essentially of cobalt or its alloys.

15. The method of claim 5, wherein the amount of first metal binder comprises, by weight of the first powder blend, from about 2 percent to about 25 percent.

16. The method of claim 5, wherein an at least one partial interface between the at least two green body regions intersects at least one surface of the multiple-region shaped green body.

17. A method for forming a multiple-region shaped green body, comprising the steps of:

forming an isostatic pressing configuration by a process comprising the steps of:

providing a containing bag having an opening, a first inner surface, and a second outer surface transitioning to said first inner surface at said opening, wherein said containing bag comprises a polymer impermeable to an isostatic fluid;

providing a first forming plug within said containing bag so as to contact at least a portion of said first inner surface of said containing bag, wherein said first forming plug has a prescribed configuration for defining at least a portion of said multiple-region shaped green body and said first forming plug comprises a polymer;

charging a first powder blend comprising a first ceramic component, a lube, and a first metal binder component into said containing bag and in contact with at least a portion of said first forming plug;

charging at least one additional powder blend comprising a second ceramic component, a lube, and a second metal binder component into said containing bag and in contact with at least a portion of said first powder blend;

providing a second forming plug within said containing bag so as to contact at least another portion of said first inner surface of said containing bag, wherein said second forming plug has a prescribed configuration for defining at least another portion of said multiple-region shaped green body and said second forming plug comprises a polymer;

providing a sealing cap having a first surface and a second surface, said first surface of said sealing cap contacting at least a portion of said first inner surface of said containing bag near said opening of said containing bag, wherein said sealing cap comprises a polymer; and providing a seal facilitating member contacting said second surface of said sealing cap; and isostatically pressing said isostatic pressing configuration to remove any entrained gasses from within said powder blends and said containing bag during pressurization thereby consolidating said powder blends to form said multiple-region shaped green body.

18. The method of claim 17, wherein said polymer comprising said containing bag and sealing cap comprises neoprene, latex, or silicone.

19. The method of claim 18, wherein said metal binder of said first powder blend and said at least one additional powder blend consists essentially of cobalt or its alloys.

20. The method of claim 17, wherein said polymer comprising said forming plug comprises polyurethane.

21. The method of claim 17, wherein said seal facilitating member comprises a polymer, a metal, or a natural material.

22. The a method of claim 17, wherein said first and second ceramic component particles are the same or different and comprise at least one of boride(s), carbide(s), nitride(s), oxide(s), silicide(s), their mixtures, their solutions, and combinations thereof.

23. The method of claim 22, wherein said first and second ceramic components are the same or different and comprise at least one carbide of one or more of Ti, Zr, Hf, V, Nb, Ta, Cr, Mo, and W.

24. The method of claim 23, wherein said at least one carbide comprises tungsten carbide.

25. The method of claim 22, wherein said first and second ceramic component particle size ranges from about submicrometer to about 30 micrometers.

26. The method of claim 22, wherein said first and second ceramic component particle size ranges from about 0.1 micrometer to about 10 micrometers.

27. The method of claim 22, wherein said first and second ceramic component particle size ranges from about 0.5 micrometer to about 10 micrometers.

28. The method of claim 22, wherein said first and second ceramic component particle size ranges from about 0.5 micrometer to about 2 micrometers.

29. The method of claim 22, wherein the amount of first metal binder comprises, by weight of the first powder blend, from about 2 percent to about 25 percent.

30. The method of claim 22, wherein the amount of first metal binder comprises, by weight of the first powder blend, from about 5 to about 15 percent.

31. The method of claim 17, wherein said multiple-region shaped green body further comprises at least one leading surface.

32. The method of claim 17, wherein said metal binder of said first powder blend and said at least one additional powder blend are the same or different and comprise one or more of iron, nickel, cobalt, their mixtures, or their alloys.

33. The method of claim 17, wherein an at least one partial interface between at least two green body regions intersects at least one surface of the multiple-region shaped green body.

34. A method for forming a near-net-shaped, multiple-region green body, comprising:

forming an isostatic pressing configuration by a process comprising the steps of:

providing a containing bag having an open end, a first inner surface, a second outer surface transitioning to said first inner surface at said open end, and a closed end away from said open end, wherein said containing bag comprises a polymer impermeable to an isostatic fluid;

providing a first forming plug having a prescribed configuration for defining at least a portion of said near-net-shaped, multiple-region shaped green body and contacting at least a portion of said first inner surface at said closed end of said containing bag, wherein said first forming plug comprises a polymer;

providing a removable partition within said containing bag, wherein said removable partition comprises a self releasing taper portion at a first end of said removable partition, at least a portion of said first end contacting at least a portion of said first forming plug, a funneling portion at a second end of said removable partition, said second end away from said first end, and an alignment member at least a portion of which extends from said second end of said removable partition and contacts at least a portion of said first inner surface of said containing bag;

charging a first powder blend comprising a first ceramic component, a lube, and a first metal binder component and at least at least one additional powder blend comprising a second ceramic component, a lube, and a second metal binder component into said containing bag to maintain a segregation of the first powder blend and the at least one additional powder blend;

providing a second forming plug having a prescribed configuration for defining at least another portion of said near-net-shaped, multiple-region green body and contacting at least a portion of said first inner surface near said open end of said containing bag, wherein said second forming plug comprises a polymer;

providing a sealing cap having a first outer surface and a second inner surface, wherein said first outer surface contacts at least a portion of said first inner surface of said containing bag near said open end of said containing bag and said sealing cap comprises a polymer; and providing a seal facilitating member contacting at least a portion of said second inner surface of said sealing cap; and isostatically pressing said isostatic pressing configuration to remove any entrained gasses from within said powder blends to form said near-net-shaped, multiple-region shaped green body.

35. The method of claim 34, further comprising a support chamber, where said support chamber contacts at least a portion of said second outer surface of said containing bag.

36. The method of claim 34, further comprising providing a third forming plug having a prescribed configuration and contacting at least a portion of said first inner surface of said containing bag and said first forming plug, wherein said prescribed configuration defines at least a third portion of said near-net-shaped, multiple-region green body and said third forming plug comprises a polymer.

37. The method of claim 34, wherein said polymer comprising said containing bag and said sealing cap comprises neoprene, latex, or silicone.

38. The method of claim 34, wherein said polymer comprising said first forming plug and said second forming plug comprise polyurethane.

39. The method of claim 34, wherein said seal facilitating member comprises a polymer, a metal, or a wood.

40. A method for forming a near-net-shaped, multiple-region green body, comprising:

forming an isostatic pressing configuration by a process comprising the steps of:

providing a containing bag having an open end, a first inner surface, a second outer surface transitioning to said first inner surface at said open end, and a closed end away from said open end, wherein said containing bag comprises a polymer impermeable to an isostatic fluid;

providing a first forming plug having a prescribed configuration for defining at least a portion of said near-net-shaped, multiple-region green body and contacting at least a portion of said first inner surface at said closed end of said containing bag, wherein said first forming plug comprises a polymer;

providing a removable partition within said containing bag, wherein said removable partition comprises a self releasing taper portion at a first end of said removable partition, at least a portion of said first end contacting at least a portion of said first forming plug, a funneling portion at a second end of said removable partition, said second end away from said first end, and an alignment member at least a portion of which extends from said second end of said removable partition and contacts at least a portion of said first inner surface of said containing bag;

charging a first powder blend comprising a first tungsten carbide component, a lube, and a first cobalt binder component and at least at least one additional powder blend comprising a second tungsten carbide component, a lube, and a second cobalt binder component into said containing bag while maintaining a segregation of the first powder blend and the at least one additional powder blend;

removing said removable partition from said containing bag while maintaining the segregation of the first powder blend and the at least one additional powder blend;

providing a second forming plug having a prescribed configuration for defining at least another portion of said near-net-shaped, multiple-region green body and contacting at least a portion of said first inner surface near said open end of said containing bag, wherein said second forming plug comprises a polymer;

providing a sealing cap having a first outer surface and a second inner surface, wherein said first outer surface contacts at least a portion of said first inner surface of said containing bag near said open end of said containing bag and said sealing cap comprises a polymer; and providing a seal facilitating member contacting at least a portion of said second inner surface of said sealing cap; and isostatically pressing said isostatic pressing configuration to remove any entrained gasses from within said powder blends to form said near-net-shaped, multiple-region green body.

41. The method of claim 40, further comprising a support chamber, where said support chamber contacts at least a portion of said second outer surface of said containing bag.

42. The method of claim 40, further comprising proving a third forming plug having a prescribed configuration and contacting at least a portion of said first inner surface of said containing bag and said first forming plug, wherein said prescribed configuration defines at least a third portion of said near-net-shaped, multiple-region green body and said third forming plug comprises an elastomer.

43. The method of claim 40, wherein said elastomer comprising said containing bag and said sealing cap comprises neoprene, latex, or silicone.

44. The method of claim 40, wherein said elastomer comprising said first forming plug and said second forming plug comprise polyurethane.

45. The method of claim 40, wherein said seal facilitating member comprises a polymer, a metal, or a natural material.

46. The method of claim 40, wherein said alignment member comprises two mutually perpendicular, intersecting members and a powder blend distributor contacting at least a portion of said first end of said removable partition.

47. The method of claim 40, wherein said first and second tungsten carbide component particle size ranges from about submicrometer to about 30 micrometers.

48. The method of claim 40, wherein said first and second tungsten carbide component particle size ranges from about 0.1 micrometer to about 10 micrometers.

49. The method of claim 40, wherein said first and second tungsten carbide component particle size ranges from about 0.5 micrometer to about 10 micrometers.

50. The method of claim 40, wherein said first and second tungsten carbide component particle size ranges from about 0.5 micrometer to about 2 micrometers.

51. The method of claim 40, wherein the amount of first cobalt binder comprises, by weight of the first powder blend, from about 2 percent to about 25 percent.

52. The method of claim 40, wherein the amount of first cobalt binder comprises, by weight of the first powder blend, from about 5 to about 15 percent.

53. The method of claim 40, wherein an at least one partial interface between at least two green body regions intersects at least one surface of the near-net-shaped, multiple-region shaped green body.

* * * * *